(12) United States Patent
Fischer et al.

(10) Patent No.: US 8,614,830 B2
(45) Date of Patent: Dec. 24, 2013

(54) PIXEL EXPOSURE AS A FUNCTION OF SUBPIXELS

(75) Inventors: Mani Fischer, Haifa (IL); Doron Shaked, Kiryat Tivon (IL); Craig Breen, Rehovot (IL); Rodolfo Jodra, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2499 days.

(21) Appl. No.: 10/950,841

(22) Filed: Sep. 27, 2004

(65) Prior Publication Data
US 2006/0066904 A1  Mar. 30, 2006

(51) Int. Cl.
G06F 15/00 (2006.01)
G06K 1/00 (2006.01)
G06K 15/00 (2006.01)
H04N 1/60 (2006.01)
H04N 1/40 (2006.01)
H04N 1/405 (2006.01)

(52) U.S. Cl.
USPC .......... 358/3.06; 358/1.18; 358/1.9; 358/3.01

(58) Field of Classification Search
USPC ......... 358/1.1, 1.2, 1.11, 1.18, 3.01, 3.06, 1.9
See application file for complete search history.

(56) References Cited

U.S. PATENT DOCUMENTS

| | | | |
|---|---|---|---|
| 5,073,953 A | 12/1991 | Westdijk | 382/176 |
| 5,497,180 A * | 3/1996 | Kawakami et al. | 347/131 |
| 5,506,941 A * | 4/1996 | Kurumida | 358/1.11 |
| 5,657,430 A * | 8/1997 | Smith et al. | 358/1.2 |
| 5,991,512 A | 11/1999 | Shaked et al. | 395/109 |
| 6,075,614 A * | 6/2000 | Ohtsuka et al. | 358/1.1 |
| 6,249,355 B1 | 6/2001 | Trask | 358/1.9 |
| 6,594,035 B1 | 7/2003 | Kresch et al. | 358/3.03 |
| 6,606,421 B1 | 8/2003 | Shaked et al. | 382/275 |
| 6,682,173 B1 | 1/2004 | Shaked et al. | 347/43 |

FOREIGN PATENT DOCUMENTS

EP  0301786  2/1989
EP  0741486 B1  11/1996

OTHER PUBLICATIONS

Buchanan, John W., et al., "Threshold-diffuse hybrid half-toning methods", *Skigraph* 1997, (Jan. 24, 1997),1-12.
Greenstein, Michael, et al., "A 2.5 MHz 2D Array with Z-Axis Backing", *Proceedings of SPIE*—vol. 3037, Medical Imaging 1997: Ultrasonic Transducer Engineering,(Apr. 1997),1-6.
http://www.dtp-aus.com, "Halftone Screens", http://www.dtp-aus.com/hlftone.htm, (Copyright 1997-2003).

* cited by examiner

*Primary Examiner* — Ming Hon

(57) ABSTRACT

A method for designing a screen includes receiving screen information related to a picture element divided into a number of subunits of the picture element, and determining an amount of an ink to apply to a media at a location of the picture element in response to the information. The subunits of the picture element have a higher resolution than the resolution of a printing apparatus at which the printing element will be reproduced.

21 Claims, 7 Drawing Sheets

| RECORD NUMBER | VALUE OF ENABLE SUBUNITS/TOTAL SUBUNITS | LASER INTENSITY ||
| --- | --- | --- | --- |
| | | POWER MODULATION LEVEL | PULSE WIDTH MODULATION VALUE |
| 0 | 0.000 | 0.000 | 0.000 |
| 1 | 0.125 | 0.125 | 0.125 |
| 2 | 0.250 | 0.250 | 0.250 |
| 3 | 0.375 | 0.375 | 0.375 |
| 4 | 0.500 | 0.500 | 0.500 |
| 5 | 0.625 | 0.625 | 0.625 |
| 6 | 0.750 | 0.750 | 0.750 |
| 7 | 0.875 | 0.875 | 0.875 |
| 8 | 1.000 | 1.000 | 1.000 |
| ⋮ | ⋮ | | |
| N | - - - | | |

PIXEL EXPOSURE AS A FUNCTION OF SUBPIXELS

BACKGROUND OF THE INVENTION

A halftone image may be prepared by a conventional computer, laser printer, ink printer, copier, or facsimile machine by digital computation and then may be stored in whole or in part prior to transferring the image to a tangible medium such as printable media, film, or a printing plate. A halftone image is composed of output picture elements (pixels). A halftone image is generally prepared to satisfy a limitation of the media or of the transfer process that prohibits the formation of an output pixel having an adjustable analog intensity level.

Preparation of a halftone image using the conventional clustered dot technique includes grouping output pixels to form a halftone dot that varies in size and proximity to other halftone dots to convey analog pixel intensity information (e.g., a shade of grey) that cannot be conveyed by varying output pixel intensity. Output pixels generally have a binary intensity. For example, a pixel is black when printed or white when not printed. Translation by digital computation usually introduces some quantization and possibly inaccurate variation of halftone dot size and placement. When a halftone image is transferred to tangible media, variation in halftone dot size and placement, such as introduced by a mechanical system, as well as any effects of quantization and inaccuracy may give rise to undesirable, visible patterns known generally as screening artifacts. Screening artifacts are not pleasing to the eye. For example, a large area of the same color in the original can have a pattern with objectionable variation in color in the reproduced image. Screening artifacts produce patterns not in the original object. One common screening artifact is known as a moire pattern. There are also additional screening artifacts.

In offset printing, screens for printing halftones were created on the basis of the intensity of the light from an original object. A contact screen that includes a criss-cross pattern of varying density in the emulsion was placed in contact on unexposed film. Light reflected from the original was passed through the lens of a special camera to expose the film. The light from the lens passed through the contact screen. The contact screen controlled the exposure of the film contacting the contact screen. In other words, the contact screen exposed the film in response to the amount, brightness or intensity of the light transmitted from the original. The larger the intensity, brightness or amount of light, the larger the dot size formed on the negative. A larger dot size on the negative produces a smaller the dot size when a copy of the original is produced. Also, when the amount of light, brightness or intensity is lower, the dot size produced on the film is smaller and hence a larger dot size will be produced in the original.

In electronic printing systems, a contact screen is not used. Even though a contact screen is not used, the screen for halftone printing is produced electronically based on the measured intensity or brightness or amount of light received at a picture element (pixel) from an original.

DETAILED DESCRIPTION

In the following description, the drawings illustrate specific embodiments of the invention sufficiently to enable those skilled in the art to practice it. Other embodiments may incorporate structural, logical, electrical, process, and other changes. Examples merely typify possible variations. Individual components and functions are optional, and the sequence of operations may vary. Portions and features of some embodiments may be included in or substituted for those of others. The scope of the invention encompasses the full ambit of the claims and all available equivalents. The following description is, therefore, not to be taken in a limited sense, and the scope of the embodiments of the present invention is defined by the appended claims.

Figure 1:
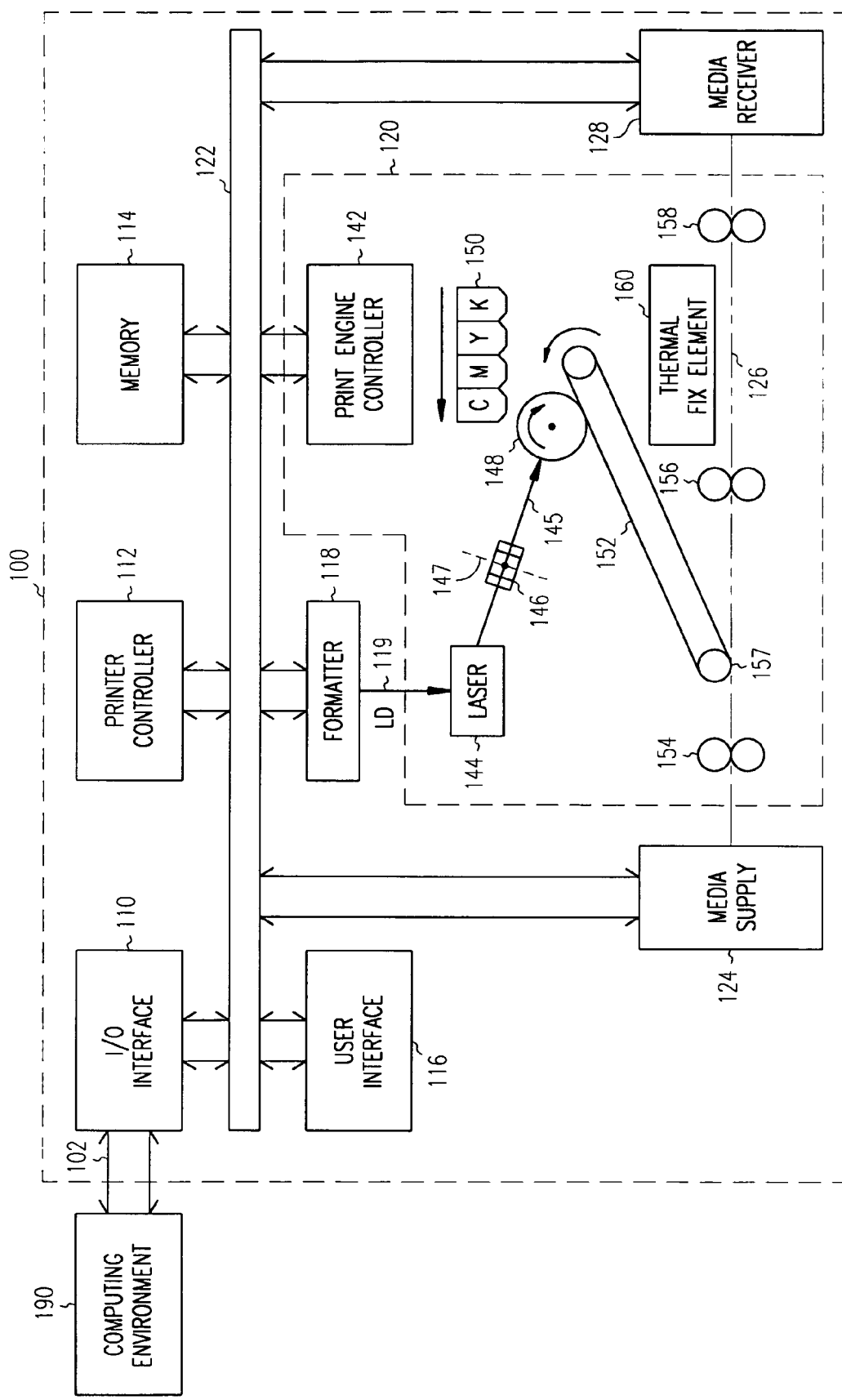
FIG. 1 is a functional block diagram of a printer, according to an embodiment of this invention.

FIG. 1 is a functional block diagram of a printer 100, according to an embodiment of this invention. A system of the present invention includes any system for providing a halftone image or a hybrid halftone image. A halftone image or a hybrid halftone image provided by such a system in digital format may be stored in a memory device or communicated by a signal in serial or in parallel. When a halftone image or a hybrid halftone image is to be transferred to a tangible medium, the system may include additional functions such as electrophotographic printing. For example, a printer according to various aspects of the present invention primarily includes an interface for receiving a description of data to be printed, a bus for communicating the data to a formatter, a paper path including a print engine for handling paper and for printing a halftone image on the paper as provided by the formatter. More particularly, exemplary printer 100 of FIG. 1 includes Input/Output ("I/O") interface 110, a printer controller 112, a memory 114, a user interface 116, a formatter 118, a print engine 120, a bus 122, a media supply 124, a paper path 126, and a media receiver 128.

The I/O interface 110 couples a printer 100 to a rendering device 200 (shown in FIG. 2), a computing environment 190 for receiving a description of data to be printed. The computing environment 190 can include a computer network or a stand-alone computer or any other computer system. The rendering device can include the computing environment 190. The I/O interface 110 includes circuits for receiving commands and data to be printed and for providing status of printer operation. For example, the I/O interface 110 couples printer 100 to a computing environment 190, such as a network or stand-alone computer, via line 102 and includes any conventional circuits for receiving command messages and data messages and for providing status messages according to various protocols. One exemplary protocol is Printer Control Language ("PCL") which is available from Hewlett Packard Company of Palo Alto, Calif. in the United States of America. Other protocols also exist.

A user interface 116 provides controls and displays that facilitate operator interaction with the printer 100. The user interface 116 includes circuits for various control switches (or a keyboard), an alphanumeric/graphic display, and various discrete indicators. Control switches may include, for example, on-line and reset. Displays may include, for example, paper status (e.g., empty, jammed) and protocol status.

The printer controller 112 provides overall control of printing functions including preparation of commands for the formatter 118, the print engine 120, and user interface 116 in response to commands received via the I/O interface 110. In one embodiment, the printer controller 112 includes a microprocessor circuit programmed to perform methods including, for example, receiving and sending messages via the bus 122 and the I/O interface 110, sensing operator controls and providing operator information displays via bus 122 and user interface 116, and controlling the cooperation of formatter 118 and print engine 120 by receiving status from each via bus 122 and commanding a sequence of operations to accomplish image formation and printing.

The memory 114 provides storage for information such as program instructions, constants, and variables. The memory device 114 includes any device capable of storage of information or any combination of devices capable of storage of information. In one embodiment, memory 114 includes a semiconductor device. In another embodiment, memory 114 includes a magnetic disk memory device. The memory 114, in some embodiments, includes nonvolatile memory devices, such as an EEPROM or CDROM. The memory device 114 includes any device capable of storage of information or any combination of devices capable of storage of information. Constants and variables include tables of information organized as data structures, indexed in any convenient manner. Examples include an input bit map, color table, output pixel geometry table, a halftone image buffer, or a table look-up associating laser power values with developing selected amounts of toner or ink. The constants, variables or tables can be organized, stored, and accessed using one or more data structures, arrays, linked lists, files, FIFO buffers, or the like.

The bus 122 is primarily controlled by printer controller 112 and includes, in one embodiment, a parallel digital communication bus. The printer controller 112 communicates via bus 122 with the I/O interface 110, the user interface 116, the memory 114, the formatter 118, the print engine 120, the media supply 124, and the media receiver 128 by sending commands and receiving status.

A paper path 126 of a printer 100 includes various sensors and media handling devices for passing roll or sheet media from a media supply 124 through the print engine 120 and to a media receiver 128. Any type of media can be used in the printer 100, including, for example, paper, transparency, film, or a plate for use in another printing process. The paper path 126 extends from media supply 124, passes through media handler 154, comes in contact with transfer belt 152 at point 157, passes through a media handler 156, passes by a thermal fix element 160, passes through a media handler 158, and extends into the media receiver 128. The temperature, humidity, orientation, media sheet counting, and media type verification, are monitored and controller by electronics (not shown) in print engine 120 at various positions along paper path 126.

The media supply 124 responds to conventional commands from printer controller 112 to provide sheet media or advance roll media as requested. The media receiver 128 can provide post-printing functions affecting media, for example, stapling, hole punching, gluing, stitching, or other media finishing operations.

The print engine 120 includes a mechanism for forming an image on media. For example, print engine 120 receives commands directing printing operations from bus 122 and includes an electrophotographic printing mechanism for printing text and graphics on media from the media supply 124. The print engine 120 prints graphics, according to various aspects of the present invention, by printing one or more halftone images or hybrid halftone images. The print engine 120 includes a print engine controller 142, a laser 144, a rotating mirror 146, a photoconductive drum 148, a toner or ink dispenser 150, a transfer belt 152, the thermal fix element 160, and the media handlers 154, 156, and 158.

The print engine controller 142 includes any circuit for coupling a print engine 120 to a communication bus 122 for receiving control messages and providing status messages. The print engine controller 142 includes, in one embodiment, a microprocessor based control circuit for controlling various power supplies and motors, and for coordinating the sequence of operations that result in the transfer of an image, such as a halftone image or hybrid halftone image, onto media as it travels along the media path 126.

To form a halftone image on media, the print engine 120 performs an electrophotographic printing process in response to laser drive signal LD conveyed from the formatter 118 to the print engine 120 on a line 119. The laser drive signal ("LD") conveys in serial a halftone image in digital format. The laser 144 receives signal LD and provides modulated laser light directed toward rotating mirror 146. The laser light is modulated in several ways. The laser light is modulated by either being "on" or "off".

In addition, if the laser light is on, the laser light is modulated in terms of intensity so that lesser than a full amount of power is delivered by the laser 144 to a photoconductive drum 148. The laser exposure can be modulated using either pulse width modulation or using laser power modulation. Specific examples will be discussed with respect to FIGS. 2-4. A rotating mirror 146 includes a six-faceted mirror assembly that rotates on an axis 147 so that modulated laser light forms a beam 145 that scans across the length of the photoconductive drum 148. The photoconductive drum 148 holds an electrostatic charge distributed on the surface of the drum. As the photoconductive drum 148 rotates on its lengthwise axis (not shown) each scan depletes a portion of this charge in accordance with the laser modulation. Each such portion is developed by the deposition of toner or ink from dispensers 150 onto the photoconductive drum 148. Dispensed toner or ink is transferred from the photoconductive drum 148 to the transfer belt 152 and then from the transfer belt 152 to media at a point 157. In an example embodiment that uses toner, a thermal fix element 160 applies heat to fix the toner to the media.

Color printing, in one embodiment, is accomplished by sequentially forming four separate halftone images or hybrid halftone images on the photoconductive drum 148, one for each color: cyan, magenta, yellow, and black (CMYK). After each image is written onto the photoconductive drum 148, a suitable toner is dispensed and transferred to the transfer belt 152. The photoconductive drum 148 is then initialized for a subsequent image. When toner for all four images has been transferred to the transfer belt 152, for one embodiment, toner is then transferred onto media at the point 157 and fixed by the thermal fix element 160. It should be noted that in some embodiments, ink or pigment or another substance can be substituted for toner.

The formatter 118, in one embodiment, includes any circuit for providing data that defines the halftone image or a hybrid halftone image. The formatter 118 includes a microprocessor circuit that cooperates with the memory 114. When the I/O interface 110 receives a description of data to be printed, a bit map description of that data is provided by the printer controller 112 and stored in the memory 114. The formatter 118, reads the bit map description, prepares one or more halftone image descriptions, and can store the halftone image descriptions in the memory 114. The formatter 118 also provides laser drive signal LD on line 119 to laser 144 for modulating laser beam 145 in accordance with the halftone image description to provide a halftone image or hybrid halftone image.

The printer 100 can be a stand-alone printer or can be part of a device that includes a printing function. Examples of devices that include a printing function include a copier, a multifunction printer ("MFP"), and commercial presses using dry toner or liquid ink. Some MFPs include a scanner, a printer, and a facsimile device.

Figure 2:
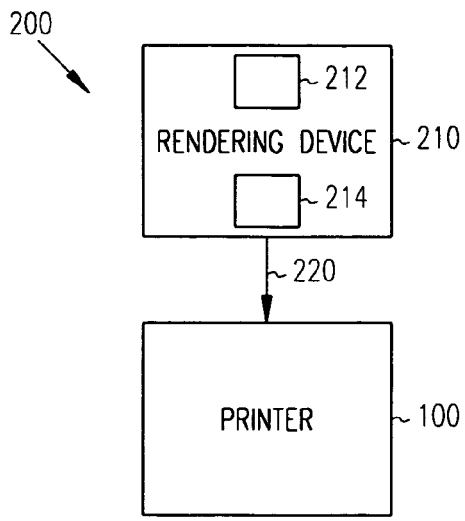
FIG. 2 is a system including a rendering device and a printer, according to an embodiment of this invention.

FIG. 2 is a schematic diagram of a system 200 which includes a rendering device 210 and a printer 100. The rendering device 210 provides control and displays that facilitate rendering of an original image. The rendering device 210 includes circuits for controlling the rendering process. One such circuit may include a microprocessor 212. The rendering device 210 may also include a sensor 214 that senses the original image on an optical basis or may receive an original digital data file. The rendering device 210 senses the original image, divides the original image into pixels and determines pixel values for the image. In other words, the rendering device 210 digitizes the original image and produces an output signal 220 that includes the location of the pixels as well as other related values associated with the pixels derived from the rendering device 210. The output 220 of the rendering device 210 is input to the printer 100. In one embodiment, the output 220 is passed to the printer 100 via the line 102 that couples to the I/O interface 110 (shown in FIG. 1). The printer 100 has a set resolution designated in dots per inch ("dpi"). The number of dots per inch determines the size of a pixel or smallest individually addressable unit when rendering an image.

Screening includes arranging ink dots on media to produce patterns of various average shades of gray or color while minimizing artifacts associated with the dot pattern. In one example embodiment, screens are designed such that the ink dots are specified at a higher resolution than the resolution of the printer 100. The screens are designed off line. In the example embodiment, a number of subpixels of a pixel are designated. Subpixels are positioned closer to one another than the fixed resolution of the printer 100 would permit. Screens for the resolution associated with the subpixels are designed. The screens at subpixel resolution are also screens that produce patterns of various average shades of gray or color while minimizing artifacts associated with the dot pattern. Usually, artifacts are more easily avoided at higher resolution. For example, if the printer 100 has a resolution of 800 dpi, the resolution of the subpixels can be 3200 dpi (4 times the fixed resolution of the printer) or 4800 dpi (6 times the fixed resolution of the printer) or any other increased dpi value. Thus, the selected resolution associated with the subpixels is greater than the fixed resolution which can be addressed by the printer 100, and consequently the ink dot patterns are better in terms of less visible artifacts.

The screen designs for the image at the higher resolution than the printer 100, or the resolution associated with the subpixels, can either be formed or closely approximated by fully or partially exposing the points corresponding to the pixels on the photoconductive drum 148 of the printer 100. The result is an enhanced image that appears smoother. As mentioned previously, the laser light is modulated in terms of intensity so that less or more than a full amount of power is delivered by the laser 144 to a photoconductive drum 148 at some pixel locations.

Figure 3:
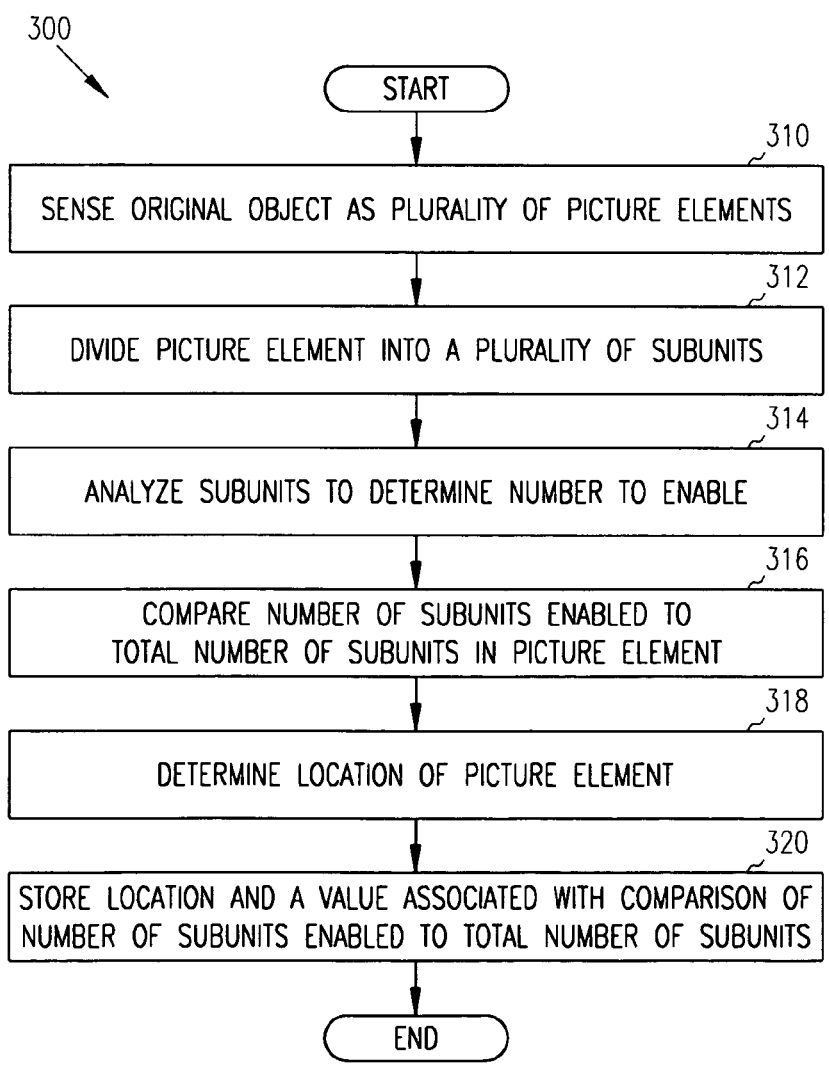
FIG. 3 is a flow diagram illustrating a method for rendering an object, according to an embodiment of this invention.

FIG. 3 is a diagram illustrating a method 300 for rendering an object, according to an example embodiment. The method 300 includes sensing the original object as a plurality of picture elements 310, and dividing at least one of the picture elements into a plurality of subunits 312. The subunits of the picture element are analyzed to determine whether the subunit is enabled 314. A subunit is enabled if it is determined that the subunit should receive ink, toner, pigment or the like. The number of enabled subunits is compared to the total number of subunits in the picture element 316. The one embodiment of the method, comparing the number of enabled subunits to the total number of subunits in the picture element that are enabled 316 includes determining the percentage of enabled subunits to the total number of subunits in the picture element. The method 300 further includes determining a location of the at least one picture element 318. A value related to comparing the number of enabled subunits to the total number of subunits in the at least one picture element is associated with the at least one picture element. The value is also associated with the location of the at least one picture element. In some embodiments, the method 300 also includes storing the value related to comparing the number of enabled subunits to the total number of subunits in the at least one picture element and the location of the at least one picture element 320. In one embodiment of the rendering method, dividing at least one picture element into a plurality of subunits of the picture element includes sizing the subunit to have dimensions less than a size associated with a resolution of a printer, such as printer 100.

In one embodiment of the invention, the picture element corresponds to a pixel and the subunit of the picture element corresponds to a subpixel. As mentioned above, generally the subpixel is positioned from a neighboring subpixel at a shorter distance than the distance associated with the fixed dpi of the printer. In other words the resolution of the subpixels is higher than the fixed resolution of the printer 100. For example, if a printer has a resolution of 800 dpi, the resolution of the subpixels can be 3200 dpi or 4800 dpi or any other increased dpi value. Thus, the selected resolution associated with the subpixels is greater than the fixed resolution which can be addressed by the printer 100. Stated in another way, the spacing between neighboring subpixels is less than the pixel spacing associated with the fixed resolution of the printer 100. In other words, the subunit or subpixel will have dimensions that are lesser than the output laser dot size of a laser printer, such as laser printer 100.

Figure 4:
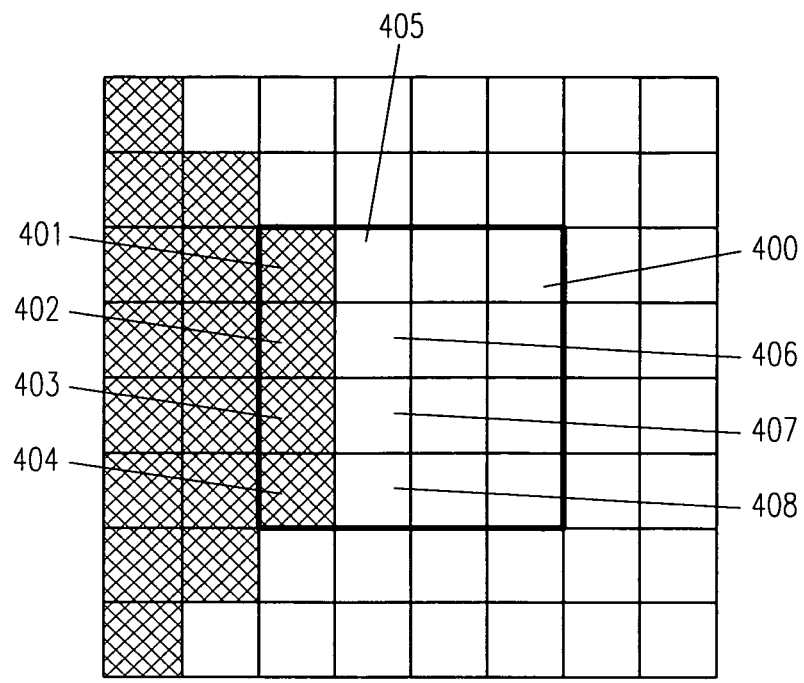
FIG. 4 is a schematic diagram of a picture element subdivided into subunits, according to an embodiment of this invention.
Figure 5:
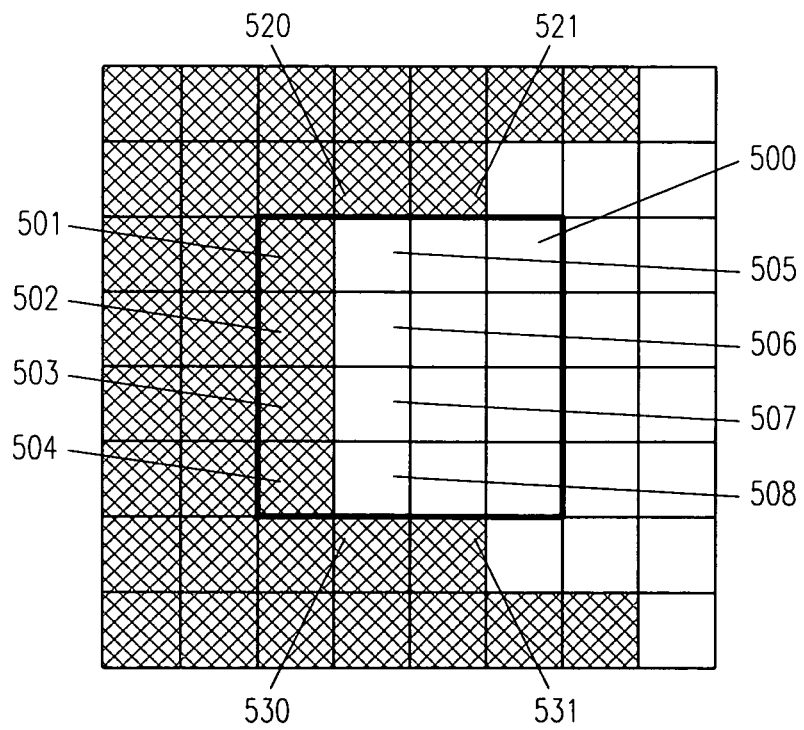
FIG. 5 is a schematic diagram of a picture element subdivided into subunits, according to an embodiment of this invention.

FIG. 4 is a schematic diagram of a picture element subdivided into subunits, according to an embodiment of the invention. FIG. 5 is also a schematic diagram of a picture element 500 divided into subunits, according to another embodiment of this invention. Now, referring both to FIGS. 4 and 5, the rendering method, previously discussed with respect to FIG. 3, will be further detailed. As shown in FIG. 4, the picture element 400 is formed as a square having a side which is N units long. As shown in FIG. 4, the picture element 400 is a square where N equals 4. As shown in FIG. 4, the picture element 400 is bound by a bold line. In other words, the picture element 400 is divided into N by N subunits or 16 subunits. The subunits of the pixel 400 include colored subunits 401, 402, 403 and 404, and white subunits 405, 406, 407 and 408. The remaining eight subunits are also white. The subunits 401, 402, 403, 404 that include color are enabled. In other words, the colored subunits 401, 402, 403, 404 would receive ink, toner or pigment if a printer could address the subunit 401, 402, 403, 404. The number of subunits enabled divided by the total number of subunits in the picture element 400 ($N^2$) in this case is four divided by sixteen which equals 0.25. This also can be expressed as a percentage value and, in this case, the value would be 25%.

FIG. 5 includes pixel 500 which is substantially the same as pixel 400. As shown in FIG. 5, the picture element 500 is bound by a bold line. Pixel 500 is divided into sixteen subunits, including colored subunits 501, 502, 503, 504 and uncolored subunits 505, 506, 507 and 508. The remaining eight subunits are also white or not enabled and therefore 0.25 or 25% of the subunits of the picture element 500 are enabled. This value, as well as the location of the picture element can be stored in memory that is associated with or accessible by the rendering device 210. It should be noted that the main difference between FIGS. 4 and 5 is that several of the subunits positioned adjacent the picture element 500 are also colored. The adjacent or neighboring subunits or subpixels include colored subunits or subpixels 520, 521, 530 and 531. It should also be noted that the subunit is not limited to being subdivided into 16 subunits. In other embodiments, the picture element can be subdivided into any number of subunits.

Figures 6, 7:
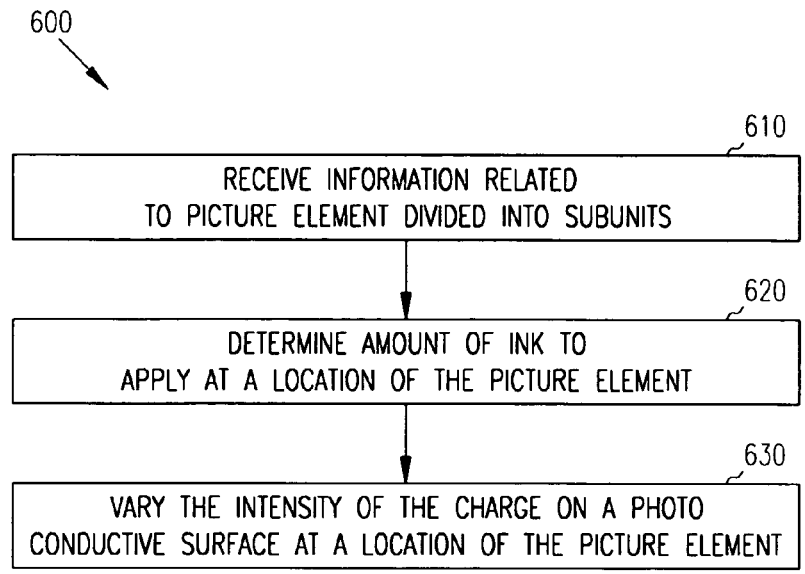
FIG. 6 is a flow diagram illustrating a method for printing an object, according to an embodiment of this invention.
FIG. 7 is an example representation of a table look up for determining laser intensity for a given value, according to an embodiment of this invention.

FIG. 6 is a flow diagram illustrating a method 600 for printing an image, according to an embodiment of the invention. The method 600 for printing an image includes receiving information related to a picture element divided into a number of subunits of the picture element 610. In one embodiment, the subunits of the picture element have a higher resolution than can be addressed by a printing apparatus. The method 600 for printing also includes determining an amount of an ink to apply to a media at a location of the picture element in response to the information 612. The method 600 also includes varying the laser exposure on a photoconductive surface at the location of the picture element 614. Varying the laser exposure on a photoconductive surface at the location of the picture element includes modulating the power level of a laser, such as laser 144 (shown in FIG. 1). In another embodiment varying the laser exposure on a photoconductive surface at the location of the picture element includes modulating the pulse width of a laser, such as laser 144 (shown in FIG. 1). Receiving information related to a picture element divided into a number of subunits 610 of the picture element includes receiving a value related to the number of subunits of the picture element that are enabled relative to the total number of subunits ($N^2$) of the picture element.

Varying the laser exposure on a photoconductive surface at a location of the picture element 614, in one embodiment, includes the use of a table lookup. FIG. 7 is an example representation of a table lookup 700 for determining laser exposure for a given value of enabled subunits divided by total subunits of a picture element, according to an embodiment of this invention. The table lookup 700 includes a number of records. The record includes a record number, a value of enabled subunits divided by the total number of subunits in a picture element 712, as well as two values associated with laser exposure. A first value of laser exposure is a power modulation level 714. In other words, for a given value of enabled subunits divided by total subunits 712, different power levels of the laser will be employed to draw an appropriate amount of ink or toner or pigment to the photoconductive surface, such as drum 148 (shown in FIG. 1). Another way to vary the laser exposure is by pulse width modulation of the laser. For a given value of enabled subunits versus total subunits, a pulse width modulation value which will attract a selected amount of ink or toner or pigment to a photoconductive surface is set forth in the lookup table 700 (units of time). The pulse width modulation value 716 and the power modulation level 714 are generally set forth as values which are less than the value for fully charging a photoconductive spot with the laser. In other words, the power modulation level 714 and the pulse width modulation value 716 will be expressed as a percentage of 100% of a laser output device value or as decimal number between zero and one. The lookup table 700 is typically stored in memory, such as memory 114, which is communicatively coupled to bus 122 in printer 100. As shown in FIG. 1, the formatter 118 or the print controller 112 can access the table lookup 700 in a memory 114 so that the laser drive signal on line 119 is varied when input to the laser 114 during a printing operation.

In some embodiments of the invention, the laser intensity may be adjusted from the value found in the table lookup 700. For example, even though picture element 400 (shown in FIG. 4) and picture element 500 (shown in FIG. 5) have virtually the same pattern of subunits, the fact that the picture element 400 and the picture element 500 are embedded in a different pattern may require additional adjustment of the laser intensity in order to produce the appropriate optical effect for both patterns. In other words, the neighboring subunits or subpixels of the neighboring picture elements or pixels may have an effect on the final laser intensity value used to charge a spot on a photoconductive surface corresponding to the location of the picture element. The laser intensity is varied from the table lookup value to produce an image that is a more accurate rendition of the original and/or pleasing to the eye.

Figure 8:
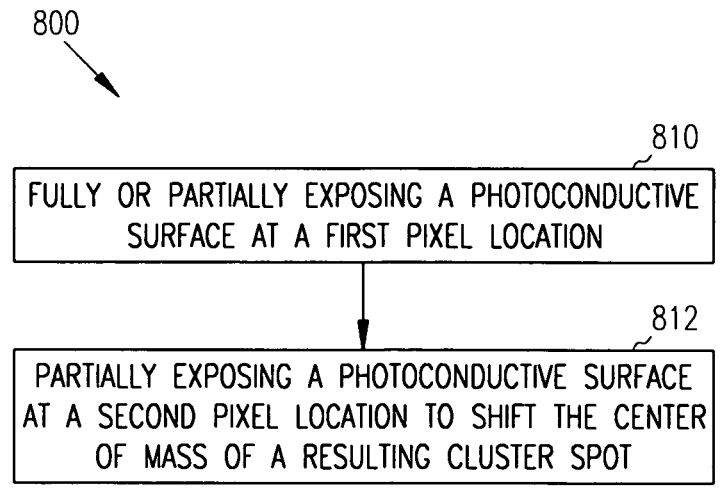
FIG. 8 is a flow diagram illustrating a method for printing an object, according to an embodiment of this invention.

FIG. 8 is a flow diagram illustrating a method 800 for printing an object, according to an embodiment of this invention. The method 800 for printing includes fully or partially exposing a photoconductive surface at a first pixel location 810, and partially exposing a photoconductive surface at a second pixel location 812. Partially exposing the photoconductive surface at the second pixel location shifts the center of mass of a resulting cluster spot. In some embodiments, the first pixel location is adjacent the second pixel location. In some embodiments, partially exposing the photoconductive surface at a second pixel location 812 includes modulating a power level of a laser used to expose the photoconductive surface. In other embodiments of the method 800, partially exposing the photoconductive surface at a second pixel location 812 includes modulating the pulse width of a laser used to expose the photoconductive surface.

Figure 9:
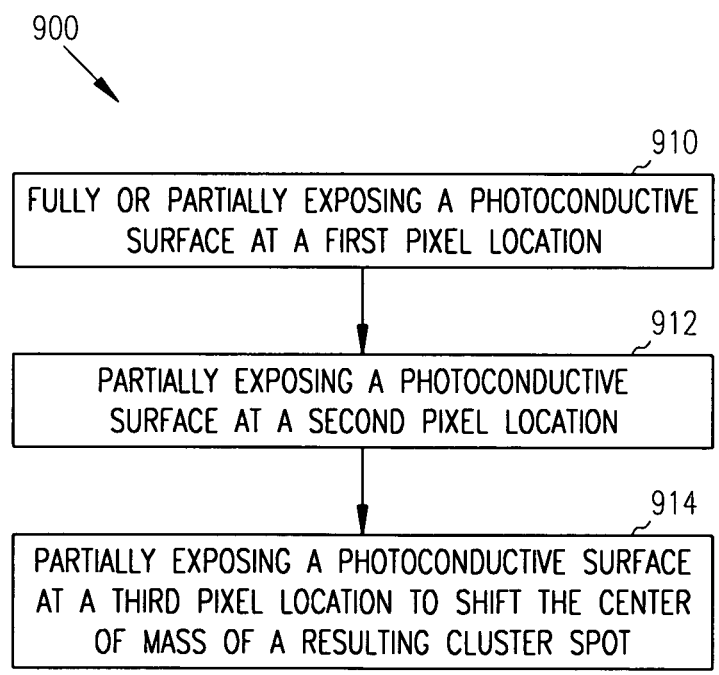
FIG. 9 is a flow diagram illustrating a method for printing an object, according to another embodiment of this invention.

FIG. 9 is a flow diagram illustrating a method 900, for printing an object, according to an embodiment of this invention. The method 900 includes fully or partially exposing a photoconductive surface at a first pixel location 910 and partially exposing a photoconductive surface at a second pixel location 912. The method 900 includes partially exposing a photoconductive surface at a third pixel location 914. The third pixel location is adjacent to the first pixel location. Partially exposing the photoconductive surface at a second pixel location 912 includes modulating the pulse width of a laser used to expose the photoconductive surface, and partially exposing the photoconductive surface at the third pixel location 914 includes modulating the power level of a laser used to expose the photoconductive surface. The partially charged second and third pixel location shift the center of mass of the resulting cluster spot formed from the first pixel location, second pixel location and third pixel location.

Figure 10:
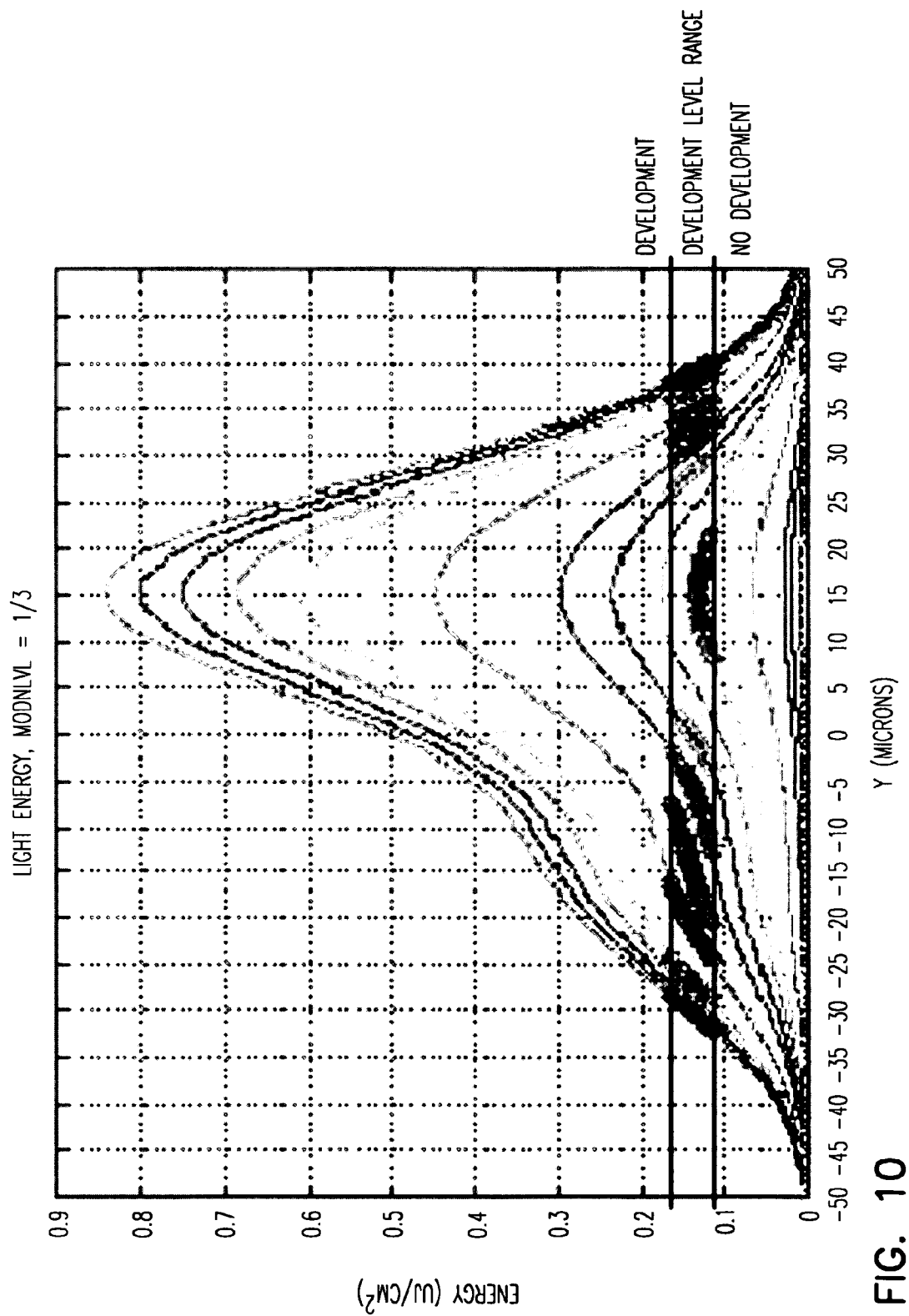
FIG. 10 is an example distribution of energy vs. light energy and distance, according to an embodiment of this invention.

FIG. 10 is an example distribution of energy versus light energy and distance shown in graphical form, according to an embodiment of this invention. FIG. 10 shows the effect of using 33 percent power on a first pixel and 100 percent power on a second pixel. Graph 1000 shown in FIG. 10 shows a distribution of the energy versus the light energy and distance between the two pixels. The graph 1000 shows that the center of mass of the resulting cluster spot is shifted toward the first pixel.

FIGS. 1-3, 6 and 7 show an apparatus for printing that includes a device for receiving information related to a picture element divided into a number of subunits of the picture element, the subunits of the picture element having a higher resolution than a printing device, and a device for determining a charge intensity on a photoconductive plate at a location on the photoconductive plate in response to the information. In some embodiments, the device for varying the charge intensity on a photoconductive plate varies a power level of a laser directed toward the photoconductive plate. In other embodiments, the device for varying the charge intensity on a photoconductive plate varies a pulse width of a laser directed toward the photoconductive plate.

FIGS. 3-7 show a method for implementing a screen includes dividing a picture element into a plurality of subunits of the picture element, and analyzing the subunits of the picture element to determine whether the subunit is enabled. The method also includes determining a percentage of subunits of the total number of subunits in the picture element that are enabled, and partially charging a location related to the picture element in response to the percentage of subunits enabled. In one embodiment of the method, partially charging a location related to the picture element includes partially discharging via an output device laser dot, or partially discharging half tone dot. Depending upon the pattern of the picture elements, the exposure of the laser can also be varied further, especially when neighboring picture elements, include portions which should carry ink or pigment or toner. The subunits of the picture element have a set of dimensions smaller than a resolution output from a printing device. In one embodiment, analyzing the subunits to determine whether the subunit is enabled further includes determining if the subunit is substantially black. In another embodiment, analyzing the subunits to determine whether the subunit is enabled further includes determining if the subunit draws ink or toner or any other type of pigment. In one embodiment of the invention, the picture element is a pixel and the subunit of the picture element is a subpixel.

Figure 11:
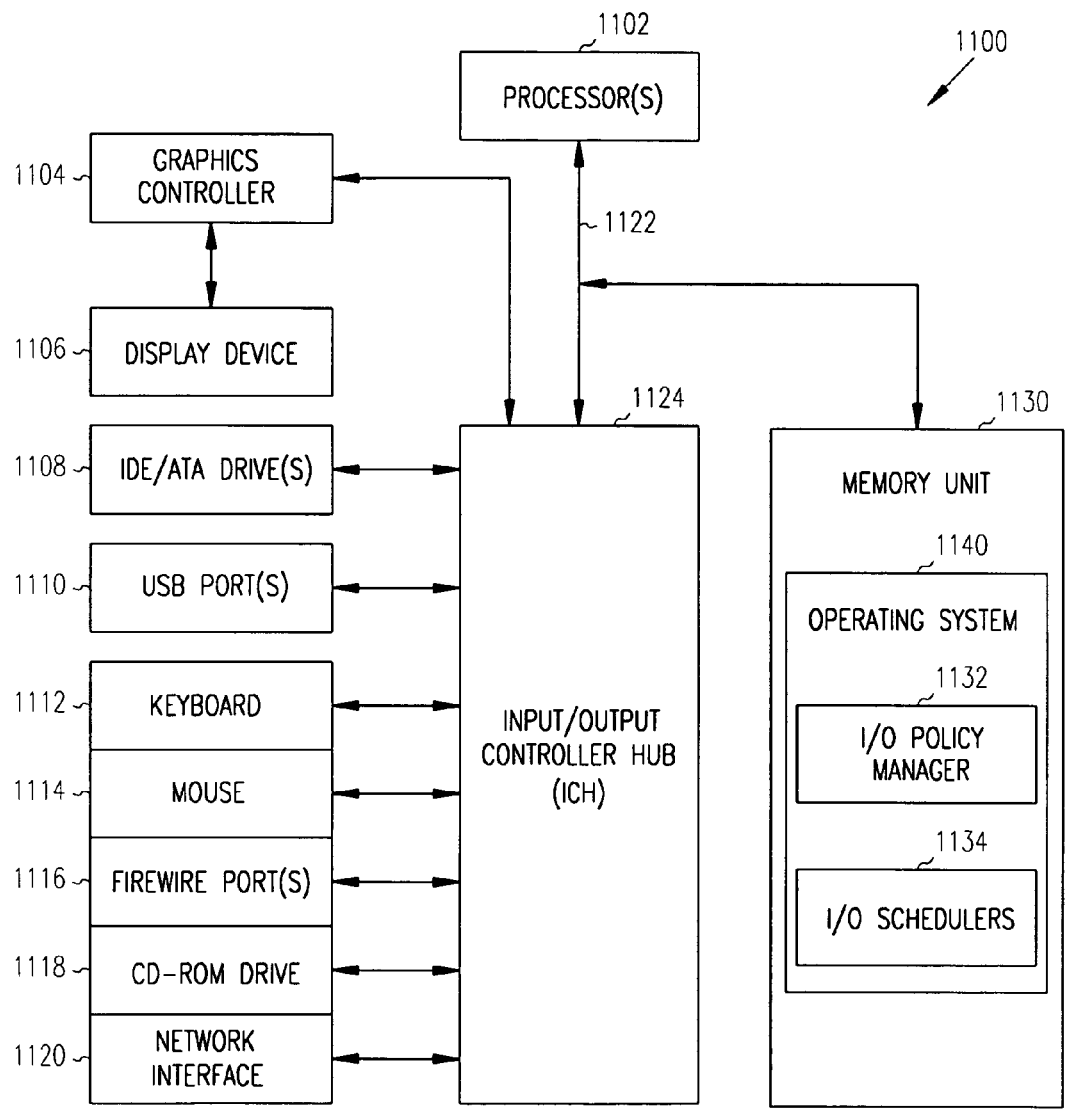
FIG. 11 illustrates an example computer system used in conjunction with certain embodiments of the invention.

FIG. 11 illustrates an example computer system used in conjunction with certain embodiments of the invention. As illustrated in FIG. 11, computer system 1100 comprises processor(s) 1102. The computer system 1100 also includes a memory unit 1130, processor bus 1122, and Input/Output controller hub (ICH) 1124. The processor(s) 1102, memory unit 1130, and ICH 1124 are coupled to the processor bus 1122. The processor(s) 1102 may comprise any suitable processor architecture. The computer system 1100 may comprise one, two, three, or more processors, any of which may execute a set of instructions in accordance with embodiments of the present invention.

The memory unit 1130 includes an operating system 1140, which includes an I/O scheduling policy manager 1132 and I/O schedulers 1134. The memory unit 1130 stores data and/or instructions, and may comprise any suitable memory, such as a dynamic random access memory (DRAM), for example. The computer system 1100 also includes integrated drive electronics (IDE) drive(s) 1108 and/or other suitable storage devices. A graphics controller 1104 controls the display of information on a display device 1106, according to embodiments of the invention.

The Input/Output controller hub (ICH) 1124 provides an interface to I/O devices or peripheral components for the computer system 1100. The ICH 1124 may comprise any suitable interface controller to provide for any suitable communication link to the processor(s) 1102, memory unit 1130 and/or to any suitable device or component in communication with the ICH 1124. For one embodiment of the invention, the ICH 1124 provides suitable arbitration and buffering for each interface.

For one embodiment of the invention, the ICH 1124 provides an interface to one or more suitable integrated drive electronics (IDE) drives 1108, such as a hard disk drive (HDD) or compact disc read only memory (CD ROM) drive, or to suitable universal serial bus (USB) devices through one or more USB ports 1110. For one embodiment, the ICH 1124 also provides an interface to a keyboard 1112, a mouse 1114, a CD-ROM drive 1118, and one or more suitable devices through one or more firewire ports 1116. For one embodiment of the invention, the ICH 1124 also provides a network interface 1120 though which the computer system 1100 can communicate with other computers and/or devices.

In one embodiment, the computer system 1100 includes a machine-readable medium that stores a set of instructions (e.g., software) embodying any one, or all, of the methodologies for dynamically loading object modules described herein. Furthermore, software can reside, completely or at least partially, within memory unit 1130 and/or within the processor(s) 1102.

A machine-readable medium that provides instructions that, when executed by a machine, cause the machine to perform operations that include dividing the original image into a plurality of picture elements, dividing at least one picture element into a plurality of subunits of the picture element, analyzing the subunits of the picture element to determine whether the subunit is enabled, and comparing the number of enabled subunits to the total number of subunits in the picture element.

A machine-readable medium that provides instructions that, when executed by a machine, cause the machine to perform operations that include receiving information related to a picture element divided into a number of subunits of the picture element, the subunits of the picture element having a higher resolution than a printing device, and determining the laser exposure on a photoconductive plate at a location on the photoconductive plate in response to the information. The machine-readable medium further causes the machine to perform an operation comprising discharging a charge of less than full intensity by modulating the power level of a laser. In some embodiments, the machine-readable medium further causes the machine to perform an operation comprising placing a charge of less than full intensity by modulating the pulse width of a laser.

Thus, a system, method, and machine-readable medium including instructions for Input/Output scheduling have been described. Although the present invention has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

Although specific embodiments have been illustrated and described herein, those of ordinary skill in the art will appreciate that any arrangement calculated to achieve the same purpose can be substituted for the specific embodiments shown. This disclosure is intended to cover any and all adaptations or variations of various embodiments of the invention. It is to be understood that the above description has been made in an illustrative fashion, and not a restrictive one. Combinations of the above embodiments, and other embodiments not specifically described herein will be apparent to those of skill in the art upon reviewing the above description. The scope of various embodiments of the invention includes any other applications in which the above structures and methods are used. Therefore, the scope of various embodiments of the invention should be determined with reference to the appended claims, along with the full range of equivalents to which such claims are entitled.

The invention claimed is:

1. A method, comprising:
    exposing a photoconductive surface of a printer at a first one of multiple pixel locations at a printer resolution based on a screen comprising subpixels at a resolution higher than the printer resolution, wherein groups of the subpixels correspond to respective ones of the pixel locations on the photoconductive surface; and
    at a second one of the pixel locations adjacent the first pixel location, exposing the photoconductive surface at an exposure level that depends on the values of the subpixels neighboring the second pixel location and corresponding to the first pixel location in relation to the values of the subpixels corresponding to the second pixel location.

2. The method of claim 1 wherein the exposing of the photoconductive surface at the second pixel location comprises modulating a power level of a laser beam that exposes the photoconductive surface.

3. The method of claim 1 wherein the exposing of the photoconductive surface at the second pixel location comprises modulating the pulse width of a laser beam that exposes the photoconductive surface.

4. The method of claim 1 further comprising partially exposing the photoconductive surface at a third pixel location adjacent the first pixel location, wherein the exposing of the photoconductive surface at the second pixel location comprises modulating the pulse width of a laser beam that exposes the photoconductive surface, and wherein the partially exposing or the photoconductive surface at the third pixel location comprises modulating the power level of a laser beam that exposes the photoconductive surface.

5. The method of claim 1 wherein the exposing of the photoconductive surface at the first pixel location comprises fully exposing the photoconductive surface at the first pixel location.

6. The method of claim 1 wherein the exposing of the photoconductive surface at the first pixel location comprises over-exposing the photoconductive surface at the first pixel location.

7. The method of claim 1 wherein the exposing of the photoconductive surface at the first pixel location comprises partially exposing the photoconductive surface at the first pixel location.

8. A non-transitory machine-readable medium storing machine-readable instructions that, when executed by a machine, cause the machine to perform operations comprising:
    exposing a photoconductive surface of a printer at a first one of multiple pixel locations at a printer resolution based on a screen comprising subpixels at a resolution higher than the printer resolution, wherein groups of the subpixels correspond to respective ones of the pixel locations on the photoconductive surface; and
    at a second one of the pixel locations adjacent the first pixel location, exposing the photoconductive surface at an exposure level that depends on the values of the subpixels neighboring the second pixel location and corresponding to the first pixel location in relation to the values of the subpixels corresponding to the second pixel location.

9. The non-transitory machine-readable medium of claim 8, wherein the machine-readable instructions further cause the machine to perform an operation comprising discharging to a charge of less than full intensity by modulating the power level of a laser.

10. The non-transitory machine-readable medium of claim 8, wherein the machine-readable instructions further cause the machine to perform an operation comprising discharging to a charge of less than full intensity by modulating the pulse width of a laser.

11. An apparatus, comprising:
    means for exposing a photoconductive surface of a printer at a first one of multiple pixel locations at a printer resolution based on a screen comprising subpixels at a resolution higher than the printer resolution, wherein groups of the subpixels correspond to respective ones of the pixel locations on the photoconductive surface; and
    means for exposing the photoconductive surface at a second one of the pixel locations adjacent the first pixel location and at an exposure level that depends on the values of the subpixels neighboring the second pixel location and corresponding to the first pixel location in relation to the values of the subpixels corresponding to the second pixel location.

12. The apparatus of claim 11, further comprising means for varying laser exposure on the photoconductive surface by varying a power level of a laser beam directed toward the photoconductive surface.

13. The apparatus of claim 11, further comprising means for varying laser exposure on the photoconductive surface by varying a pulse width of a laser beam directed toward the photoconductive surface.

14. A method, comprising:
    designing a screen for a printer, wherein the screen comprises subpixels at a resolution higher than a printer resolution, and groups of the subpixels correspond to respective pixel locations on a photoconductive surface of the printer at a printer resolution;
    exposing a photoconductive surface at a first one of the pixel locations based on the screen; and
    at a second one of the pixel locations adjacent the first pixel location, exposing the photoconductive surface at an exposure level that depends on a number of the subpixels corresponding to the first pixel location that are enabled relative to a total number of the subpixels corresponding to the first pixel location and on the values of the subpixels corresponding to the first pixel location that neighbor the second pixel location in relation to the values of the subpixels corresponding to the second pixel location.

15. The method of claim 14, wherein the exposing of the photoconductive surface at the second pixel location comprises determining the exposure level based on a functional relationship between the percentage of the enabled subpixels corresponding to the first pixel location and the percentage of enabled subpixels corresponding to the second pixel location.

16. The method of claim 14, wherein the exposing of the photoconductive surface at the second pixel location comprises determining the exposure level based on a number of enabled subpixels corresponding to a third one of the pixel locations that neighbors the second pixel location.

17. The method of claim 14, wherein the exposing of the photoconductive surface at the first pixel location comprises partially exposing the photoconductive surface at the first pixel location.

18. The method of claim 14, wherein the exposing of the photoconductive surface at the first pixel location comprises fully exposing the photoconductive surface at the first pixel location.

19. A method, comprising:
  exposing a photoconductive surface of a printer at a first one of multiple pixel locations at a printer resolution based on a screen comprising subpixels at a resolution higher than the printer resolution, wherein groups of the subpixels correspond to respective ones of the pixel locations on the photoconductive surface; and
  at a second one of the pixel locations adjacent the first pixel location, exposing the photoconductive surface at an exposure level that depends on a number of the subpixels corresponding to the first pixel location that are enabled relative to a total number of the subpixels corresponding to the first pixel location and on the values of the subpixels corresponding to the first pixel location that neighbor the second pixel location in relation to the values of the subpixels corresponding to the second pixel location.

20. The method of claim 19, wherein the exposing of the second pixel location operates to shift a center of mass of a resulting cluster spot from the second pixel location.

21. A method, comprising:
  dividing each of a plurality of picture elements into a plurality of subunits;
  for each of the picture elements, determining a percentage of the subunits in the picture element that are enabled; and
  for each of the picture elements, designating a respective partial exposure for the picture element as a function of the percentage of subunits that are enabled in the picture element and as a function of a respective number of the subunits in at least one of the other picture elements that are enabled adjacent the picture element;
  wherein the dividing, the determining, and the designating are performed by a computer.

\* \* \* \* \*

UNITED STATES PATENT AND TRADEMARK OFFICE
CERTIFICATE OF CORRECTION

| | | |
|---|---|---|
| PATENT NO. | : 8,614,830 B2 | Page 1 of 1 |
| APPLICATION NO. | : 10/950841 | |
| DATED | : December 24, 2013 | |
| INVENTOR(S) | : Mani Fischer et al. | |

It is certified that error appears in the above-identified patent and that said Letters Patent is hereby corrected as shown below:

In the Claims

In column 11, line 45, in Claim 4, delete "or" and insert -- of --, therefor.

Signed and Sealed this
Thirteenth Day of May, 2014

Michelle K. Lee
*Deputy Director of the United States Patent and Trademark Office*